(12) United States Patent
Owen

(10) Patent No.: US 6,916,141 B2
(45) Date of Patent: Jul. 12, 2005

(54) THREE DIMENSIONAL TOOL GUIDE

(76) Inventor: Leslie John Owen, 30 Bennett Road, Thurgoona, New South Wales 2640 (AU)

( * ) Notice: Subject to any disclaimer, the term of this patent is extended or adjusted under 35 U.S.C. 154(b) by 17 days.

(21) Appl. No.: 10/607,273

(22) Filed: Jun. 27, 2003

(65) Prior Publication Data
US 2004/0022595 A1 Feb. 5, 2004

Related U.S. Application Data
(60) Provisional application No. 60/393,381, filed on Jul. 5, 2002.

(51) Int. Cl.$^7$ ................................................. B23C 1/16
(52) U.S. Cl. ......................... 409/93; 409/85; 409/237; 144/135.4
(58) Field of Search ........................... 409/85, 93, 109, 409/115, 121, 126, 94, 116, 117, 125, 237, 236, 238, 239; 700/161; 144/135.2, 135.3, 135.4; 248/653, 654, 656, 657

(56) References Cited
U.S. PATENT DOCUMENTS

| | | | |
|---|---|---|---|
| 132,594 A | * 10/1872 | Minter | 409/85 |
| 3,543,639 A | * 12/1970 | Hill | 409/99 |
| 3,800,660 A | * 4/1974 | Gladwin | 409/121 |
| 3,923,086 A | * 12/1975 | Spohn, Jr. | 409/236 |
| 4,300,863 A | * 11/1981 | Partain | 409/109 |
| 4,450,882 A | * 5/1984 | Hitchcock et al. | 409/110 |
| 4,865,093 A | * 9/1989 | Ford et al. | 409/124 |
| 5,135,393 A | * 8/1992 | Eidenbenz et al. | 409/124 |
| 5,799,543 A | * 9/1998 | Nagai et al. | 74/490.09 |
| 5,988,959 A | * 11/1999 | Sugata | 409/141 |
| 6,067,695 A | * 5/2000 | Momoitio | 29/26 A |
| 6,539,992 B1 | * 4/2003 | Nuss | 144/135.3 |
| 6,592,308 B1 | * 7/2003 | Owen | 409/235 |

* cited by examiner

Primary Examiner—Derris H. Banks
Assistant Examiner—Dana Ross
(74) Attorney, Agent, or Firm—Dennison, Schultz, Dougherty & MacDonald

(57) ABSTRACT

A three dimensional tool guide includes first, second and third elongate guide arms mounted orthogonally and in series so as to provide X, Y and Z axes for the guide. The arms are interconnected by carriage means allowing free relative movement between adjacent arms in at least one direction and a balancing means to allow substantially unbiased vertical movement for the arm or arms. The first arm is adapted for mounting to a reference point and the third arm is adapted for holding and guiding the tool.

17 Claims, 3 Drawing Sheets

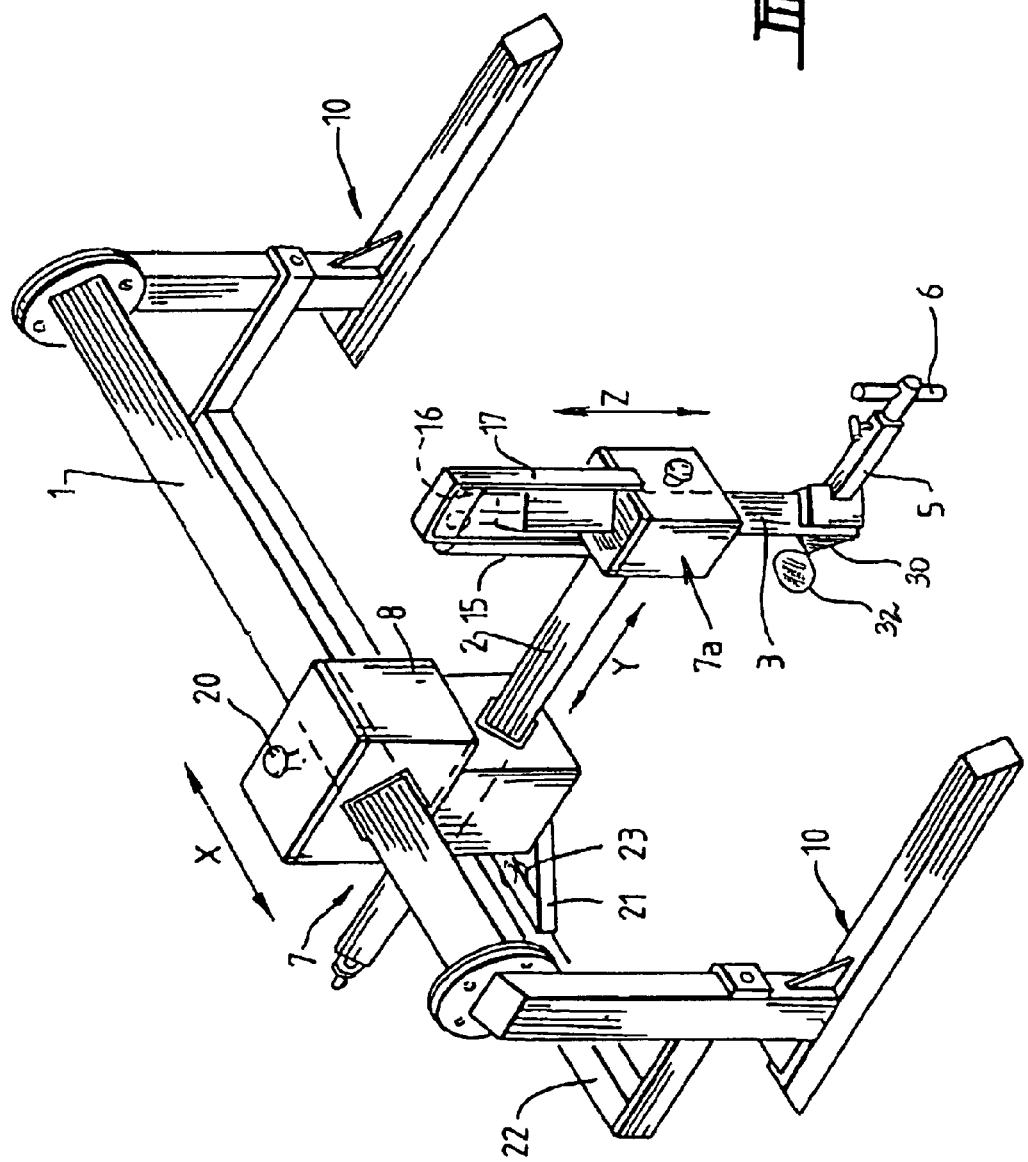

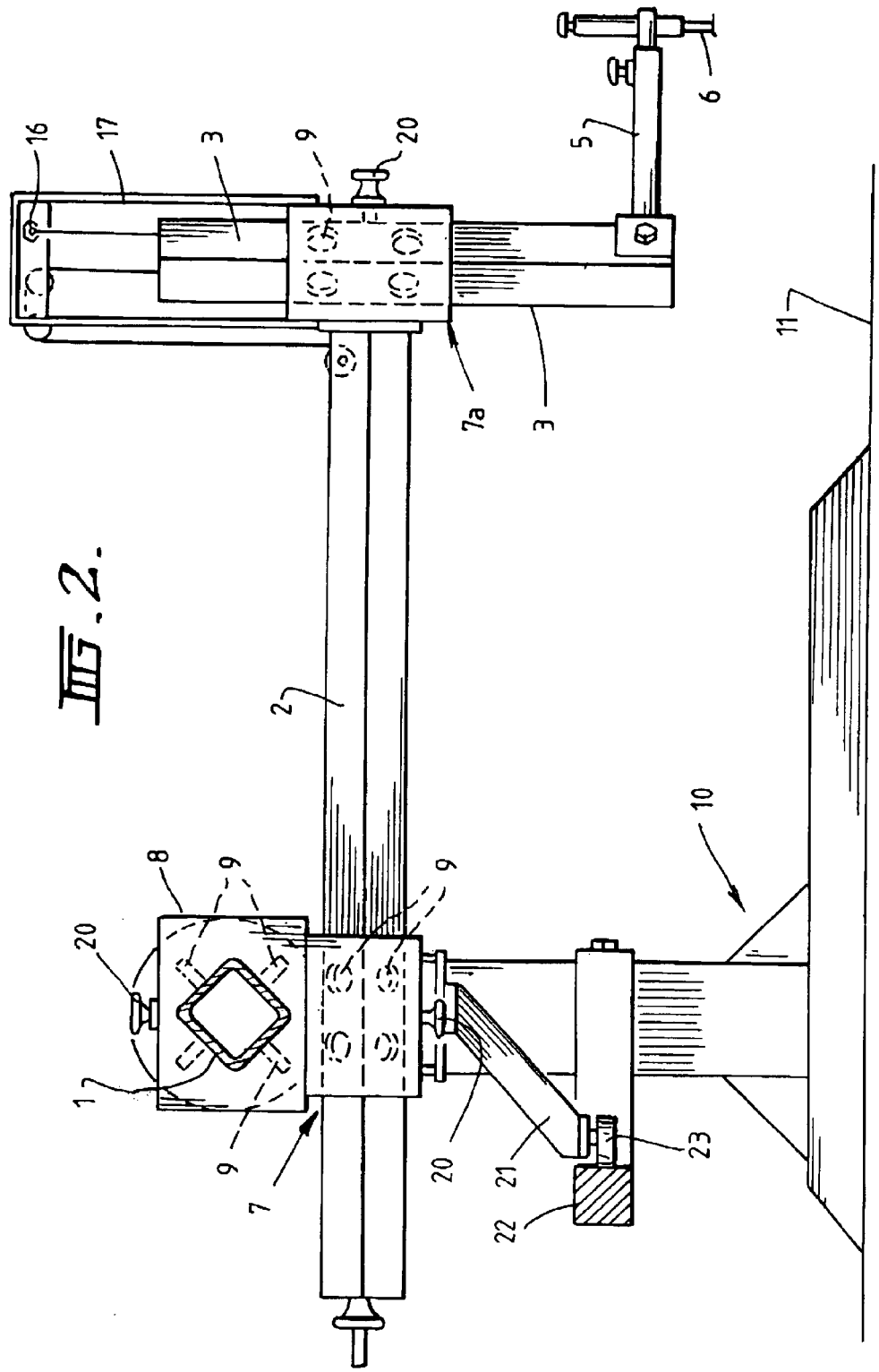

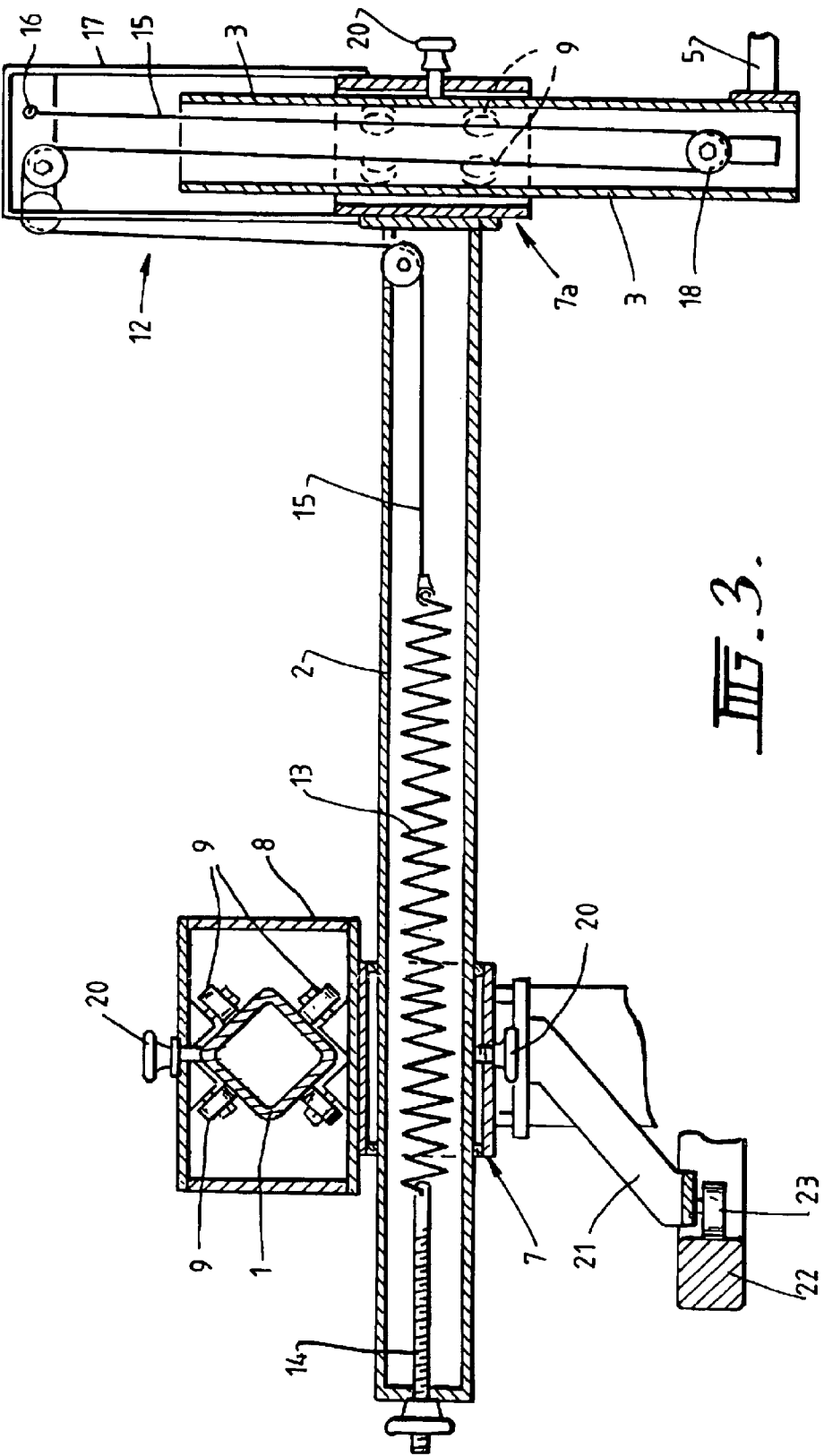

THREE DIMENSIONAL TOOL GUIDE

This application claims the benefit of provisional application No. 60/393,381, filed Jul. 5, 2002.

BACKGROUND OF THE INVENTION

This invention relates to tool guides and in particular to a guide adapted to provide three dimensional control for a router or similar tool and more particularly to a three dimensional (3D) pattern tracing or copying guide.

Pattern tracing and wood machining in two dimensions is a task often performed by the hand held router. Routers excel at such precision high speed cutting and shaping work. Tracing and shaping in two dimensions can be aided by a range of jigs or guides which operate in conjunction with collars positioned on the router footplate to assist the router in following the jig or guide. A wide range of jigs are available for such work.

Pattern tracing in three dimensions however, is a more demanding task as the cutting tool cannot rely on a stationary mount or guide in one dimension as is the case with 2D shaping where the router base can be firmly placed on the work. 3D shaping requires free, but controlled, movement in three dimensions and accordingly the type of jigs or guides used in 2D pattern cutting cannot be used in 3D work.

In order to achieve 3D pattern tracing, the tool or router, must be capable of free movement in three dimensions while faithfully following a pattern or jig providing the 3D template of choice.

SUMMARY OF THE INVENTION

In one aspect the invention provides a three dimensional tool guide comprising first, second and third elongate guide arms mounted orthogonally and in series so as to provide X, Y and Z axes for said guide wherein said arms are interconnected by carriage means allowing free relative movement between adjacent arms in at least one direction, and a balancing means to allow substantially unbiased vertical movement for said arm or arms, wherein said first arm is adapted for mounting to a point and said third arm is adapted for holding said tool. Said third arm may be provided with a pilot guide means for tracing a template.

The balancing means may be mechanical, magnetic, pneumatic, hydraulic or any suitable means to establish a vertical bias to counteract the natural bias of gravitational pull. The balancing means may be adjustable to allow for various weights of tool fitted to said guide.

The balancing means is most preferably mechanical and provides an adjustable biasing means between a vertical arm and its adjacent horizontal arm. The biasing means may be a resilient member, for example, a compression or tension spring, with the balancing means comprising mechanical elements linking the relative vertical movement between said vertical arm and its adjacent horizontal arm via said resilient member.

The elongate guide arms are most preferably non round in cross-section such that said carriage means are limited to linear movement along the length of said arm and not subject to rotational movement about said arm. The guide arms are most preferably square in cross section with said carriage means comprising a transmission housing having roller bearings adapted to co-operate with said square cross section of said arms as a guide track.

The guide arms are most preferably mounted in an oblique configuration to assist in self alignment of said carriage during tracking along said arms.

The guide most preferably comprises a first guide arm rigidly mounted to a reference point or substrate and extending in a horizontal direction, a second guide arm mounted via a dual carriage thereto in an orthogonal direction also extending horizontally so as to provide free movement throughout a horizontal plane, a third guide arm mounted via a single carriage thereto in an orthogonal direction extending vertically so as to provide free movement in a vertical plane wherein the combined action of said first, second and third interconnected arms provides free movement in three dimensions wherein said third guide arm is provided with a balancing means to allow substantially un-bias vertical movement between said third and second arms and wherein said third arm is further provided with a means for mounting a tool and pilot means for tracing a template.

The balancing means may be an adjustable tension spring mounted to the remote end of said second arm and which is attached to said third arm via a cable and pulley tackle block such that any vertical movement of said third arm is biased by said tension spring so as to substantially counteract security bias.

BRIEF DESCRIPTION OF THE DRAWINGS

The invention will be more fully described with reference to the following figures which show particularly preferred embodiments of the invention only and are not to be taken as limiting the scope of the invention.

FIG. 1 shows a perspective view of the guide from above;

FIG. 2 shows a side view of the guide; and

FIG. 3 shows a cut away view of the balancing mechanism of the guide.

DESCRIPTION OF THE PREFERRED EMBODIMENTS

Referring initially to FIGS. 1 and 2, a first embodiment of the three dimensional tool guide is shown. The tool guide comprises three elongate guide arms being made up of a first guide arm 1, a second guide arm 2 and a third guide arm 3 where the first and second guide arms are orientated in a horizontal plane and the third guide arm 3 is orientated in a vertical plane. The guide arms are adapted to provide a means for transporting a tool 32 fitted to the remote end of one of the arms, in a free formed three dimensional manner under the guidance of a pilot arm 5 fitted to the remote end of the third arm and which is provided with a pilot guide pen 6 adapted to follow the three dimensional or two dimensional contour of a template.

In order to provide the free three dimensional movement, the first and second arms are connected orthogonally via a carriage means 7 taking the form of a dual carriage comprising a transmission housing 8 fitted with roller bearings 9 which are adapted to track longitudinally along the length of the elongate arms. The dual configuration of the carriage 7 allows movement of the second arm 2 backwards and forwards along the longitudinal length of the first arm 1 in an axial direction X and the secondary path of the dual carriage 7 allows the longitudinal movement of the second arm 2 in an axial direction Y relative to the first arm. At the remote end of the second arm 2 a further carriage means 7a is provided, this time in the form of a single carriage which is adapted to mount a third arm 3 in a vertical orientation such that the third arm 3 can move up and down in a vertical orientation Z relative to the second arm 2 and in an orthogonal direction. In this manner, the combined use of the three elongate arms 1, 2 and 3, and the carriage means 7 and 7a provide for the complete movement of the third arm in all three dimensions. The first arm 1 is preferably mounted by way of a mounting means 10 to a substrate 11, generally in the form of a work bench or working surface, onto which the material to be worked can be placed.

The elongate arms are preferably of square cross-sectional configuration and mounted in an oblique configuration such that the carriage means 7 and 7a and bearings 9 are self centering and provide two primary upper rolling surfaces so as to ensure smooth and accurate movement of the carriage along the length of the elongate arms.

Referring now to FIG. 3, the guide is further provided with a balancing mechanism 12 which is provided for the purposes of negating the effect of gravity on the vertical arm and attached tool which would normally cause the tool to weigh down on the work placed on the substrate 11. The balancing mechanism may be affected by any means but in this embodiment of the invention is a tension spring 13 is mounted by way of an adjustable screw 14 at the remote end of the second arm 2. The tension spring is fitted to a cable 15 which by way of a series of fixed and moveable pulley sheave blocks is mounted to an anchorage point 16, being an extension support means 17, fitted to the second arm 2. The third arm 3 is fitted to this pulley shackle block system by way of a moveable sheave pulley block 18 located on the third arm 3. Alternatively, the cable 15 could be directly attached to the third arm 3 thereby providing a variation on the mechanical advantage provided by the pulley system. In this manner, the vertical movement on the third arm 3 up and down the single carriage means 7a is relayed via the cable 15 and pulley systems to the tension spring 13 such that a suitable adjustment of the tension screw 14 can provide sufficient counteraction of the downpull of gravity to negate the bias on the third arm 3 and attached tool such that substantially unbiased vertical movement of the third arm 3 and attached tool can be affected so as to provide substantially neutral movement of the tool in all three dimensions as the combined action of the elongate guide arms accounts for movement in all three dimensions.

In order to provide an optional reinforcement of the first arm 1 so as to assist the arm in resisting torsional distortion under the weight of second and third arms and attached tool, the underside of the carriage means 7 may be provided with a rearwardly extending support 21 which is adapted to cooperate with an elongate support rail 22 positioned beneath and parallel to first guide arm 1. The lower end of the support is provided with a roller bearing 23 such that as the carriage 7 is moved laterally along the length of the first guide arm 1, it is supported so as to resist any torsional twisting of that guide arm by the action of the supporting member 22.

The carriage means may be provided with locking means 20 to allow the carriage means to be locked to their respective elongate arms and thereby optionally restraining the available movement of the guide.

The tool 32 is mounted on a lower portion of the third elongate guide arm 3 by a mounting means 30, and can take the form of any cutting tool but would most preferably be provided as an electric router or trimming tool of sufficient capacity to cope with the removal of work required for the job at hand.

In use, the guide of the invention would be set up and suitably balanced to ensure free movement in all three dimensions and a template would be mounted onto the substrate 11, being a work bench or similar situation. The template would be positioned so as to allow complete interaction with the pilot guide pen 6 and to ensure complete coverage of the guide pen 6 over the whole surface area of the template. A workpiece would then be mounted onto the substrate 11 and positioned suitably with respect to the tool. The positioning of the work and size of the work would of course be configured to correspond with the template such the complete coverage of the pilot guide pen 6 over the area of the template would be accommodated by the movement of the tool over the work. The tool would then be operated and the pilot guide pen and pilot arm 5 would be progressively traced over the template wherein the tool would faithfully follow the movement of the pilot guide pen 6 and cause a corresponding cutting action to be affected on the work thereby duplicating the three dimensional shape of the template. The key advantage of the current invention is the provision of a rigid guiding system of sufficient mass so as to provide sufficient inertia to the movement of the tool to ensure that the tool moves smoothly and progressively in response to the guiding movement of the pilot pen 6 without a tendency to unnecessarily or undesirably react to variations in the work or with any unnecessary vibration or chattering.

The invention provides for the first time a highly compact and robust three dimensional duplicating system which can be readily adapted for use with available tooling to provide a reliable and accurate three dimensional duplicating system.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A three dimensional template tracing tool guide comprising:
   first, second and third elongate guide arms mounted orthogonally and in series so as to provide X, Y and Z axes for said template tracing tool guide, said first, second, and third elongate guide arms being interconnected by a plurality of carriage means allowing free relative movement between said first and second elongate arms in at least one direction, and
   a balancing means to allow substantially unbiased vertical movement for said third elongate guide arm,
   wherein said first elongated guide arm is adapted for mounting to a reference point and said third elongated guide arm is adapted for holding and guiding a tool,
   wherein said third elongate guide arm is provided with a pilot guide means for tracing a template.

2. A guide according to claim 1, wherein said plurality of carriage means operate independently of each other.

3. A guide means according to claim 1, wherein said balancing means includes at least one of mechanical magnetic, pneumatic, hydraulic or other means adapted to establish and maintain a vertical bias to counteract the natural bias of gravitational pull for said third arm and said mounted tool.

4. A guide according to claim 3, wherein said balancing means is adjustable.

5. A guide according to claim 3, wherein said balancing means is mechanical and provides an adjustable biasing means between a vertical arm and its adjacent horizontal arm.

6. A guide according to claim 5, wherein said biasing means includes a resilient means.

7. A guide according to claim 6, wherein said balancing means includes said biasing means and mechanical elements linking said third elongate guide arm and said second elongated guide arm via said resilient means.

8. A guide according to claim 1, wherein said first, second and third elongate guide arms are non round in cross section, such that said plurality of carriage means are limited to linear movement along the length of said first, second and third elongate guide arms and not subject to rotational movement about said first, second, and third elongated guide arms.

9. A guide according to claim 8, wherein said first, second, and third elongate guide arms are substantially square in cross section.

10. A guide according to claim 9, wherein said carriage means comprises a transmission housing having roller bearings adapted to cooperate with said square cross section of said first, second, and third elongate arms as a guide track.

11. A guide according to claim 1, wherein said first, second, and third elongate guide arms are mounted in an oblique configuration.

12. A guide according to claim 1, wherein said first guide arm is rigidly mounted to the reference point and extends in a substantially horizontal direction.

13. A guide according to claim 12, wherein said second guide arm is mounted to said first guide arm in an orthogonal direction via a dual carriage means allowing free movement of said second arm throughout a horizontal plane.

14. A guide according to claim 13, wherein said third guide arm is mounted to said second guide arm in an orthogonal direction via a single carriage means extending vertically.

15. A guide means according to claim 14, wherein said third guide arm is provided with said balancing means.

16. A guide according to claim 9, wherein said third elongated guide arm is provided with a means for mounting a tool and a pilot means for tracing a template.

17. A guide according to claim 1, wherein said balancing means comprises an adjustable tension spring mounted to the remote end of said second arm and which is attached to said third arm via a cable and pulley tackle block.

* * * * *